United States Patent [19]

Okonogi et al.

[11] Patent Number: 5,279,847
[45] Date of Patent: Jan. 18, 1994

[54] METHODS FOR PRODUCING EMULSIONS, LOW-FAT SPREAD AND OIL-IN-WATER-IN-OIL TYPE SPREAD

[75] Inventors: Shigeo Okonogi, Tokyo; Ryo Kato; Yuzo Asano, both of Kanagawa; Hiroya Yuguchi; Renzo Kumazawa, both of Tokyo; Kazuyoshi Sotoyama; Kiyotaka Takahashi, both of Kanagawa; Masahisa Fujimoto, Zama, all of Japan

[73] Assignee: Morinaga Milk Industry Co., Ltd., Tokyo, Japan

[21] Appl. No.: 683,182

[22] Filed: Apr. 11, 1991

[51] Int. Cl.$^5$ .................................... A23C 15/02
[52] U.S. Cl. .................................. 426/603; 426/663
[58] Field of Search ................... 426/663, 603, 602

[56] References Cited

U.S. PATENT DOCUMENTS 4,366,180  12/1982  Altrock et al. ............... 426/602
4,555,411  11/1985  Moran ........................... 426/603

FOREIGN PATENT DOCUMENTS 61-271006  12/1986  Japan .
 2-95433   4/1990  Japan .

Primary Examiner—Carolyn Paden
Attorney, Agent, or Firm—Wenderoth, Lind & Ponack

[57] ABSTRACT

A method for producing an emulsion by dispersing a liquid to form a dispersed phase into a liquid to form a continuous phase through a microporous membrane, in which:

(a) a W/O type emulsion is produced by dispersing an aqueous phase at low pressure into a fatty phase through a hydrophilic microporous membrane previously treated with the fatty phase;

(b) an 01/W/02 type emulsion is produced by dispersing an O/W type emulsion at low pressure into the fatty phase (02) through the same microporous membrane as (a) above;

(c) an O/W type emulsion is produced by dispersing a fatty phase containing a hydrophobic emulsifying agent into an aqueous phase through a hydrophilic microporous membrane. Furthermore, methods for producing a low-fat spread and an oil-in-water-in-oil type spread by rapidly cooling a emulsion to plasticize and kneading, in which:

(d) a W/O type emulsion for low-fat spread is prepared by dispersing an aqueous phase into a fatty phase through a microporous membrane:

(e) an 01/W/02 type emulsion for an oil-in-water-in-oil type spread is prepared by dispersing an 01/W type emulsion into a fatty phase (02) through the same membrane as (d) above.

10 Claims, 1 Drawing Sheet

F I G.1
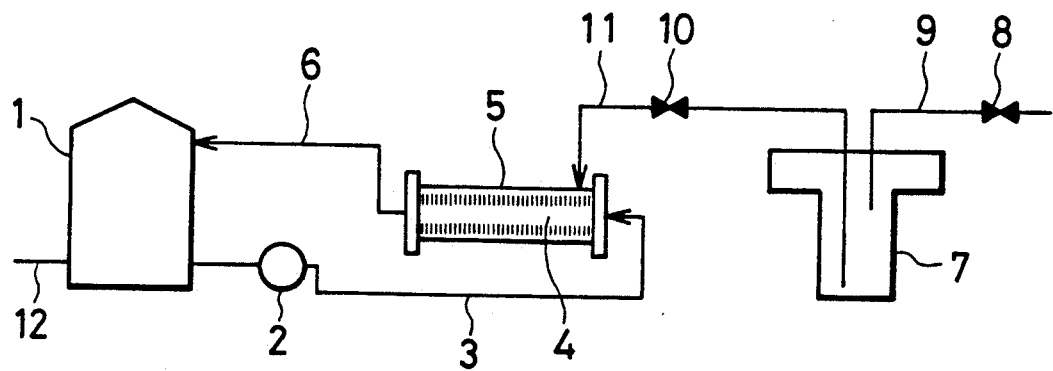

METHODS FOR PRODUCING EMULSIONS, LOW-FAT SPREAD AND OIL-IN-WATER-IN-OIL TYPE SPREAD

FIELD OF THE INVENTION

The present invention relates to methods for producing emulsions, a low-fat spread and an oil-in-water-in-oil type spread which consist of an aqueous phase and a fatty phase. More specifically, it relates to new methods for producing stable emulsions which are useful for foodstuff, cosmetics, chemicals, feed or the materials thereof (hereinafter referred to as foodstuff), and also to new methods for producing a low-fat spread and an oil-in-water-in-oil type spread using such emulsions.

PRIOR ART

Conventionally, several methods for producing emulsions have been known in which emulsifying agents are added to the liquid which will form a dispersed phase and/or the liquid which will form a continuous phase. In the prior methods, a stirrer, a homogenizer, a colloid mill or supersonic waves are employed to emulsify the two phases.

However, for the emulsions of foodstuff produced by these methods, the two phases may be separated. Accordingly, it was required to make the emulsion particles finer, in other words, to perform stirring or homogenization for long duration or at high pressures, to prevent such separation.

On the other hand, a method for producing emulsions, entirely different from those methods, has been recently developed in Japan (Patent Previsional Publication No. 95433/90; hereinafter referred to as prior invention). The method according to this prior invention is characterized by dispersing the liquid to form a dispersed phase into the another liquid to form a continuous phase through a microporous membrane having a uniform micropore diameter.

A method has also been proposed to improve filtering efficiency by means of treating a porous membrane with an anionic lipid (Patent Provisional Publication No. 271006/86; a method using an ultrafiltration membrane). By this method, an ultrafiltration membrane obtained by treating a macromolecule porous membrane with an anionic lipid to form 2 molecular surface layers, thereby providing an anti-contamination ultrafilter membrane improved so that emulsified cutting oils, negative-charged emulsions are allowed to efficiently without fouling filter.

When the method according to the prior invention, using a microporous membrane is applied to a manufacturing process on a large scale to produce foodstuff and other emulsions, it has become apparent that several problems exist in their operability and other aspects. Namely, when water-in-oil (W/O) type emulsions or oil-in-water-in-oil (01/W/02) type emulsions are produced by the method according to the prior invention, a hydrophobic porous membrane is used. Such a hydrophobic porous membrane is produced by introducing hydrophobic hydrocarbon group on the surface of the microporous membrane by using a silylation agent, or by other hydrophobic treatments. However, the hydrophobic treatment has the following problems;

1. Problems with operability: to regenerate the membrane for re-use, a complate cleaning treatment and another hydrophobic treatment must be repeated.
2. Hygenic problems by use of silylation agents.

Moreover, when W/O type emulsion or 01/W/02 type emulsion is produced with such hydrophobic porous membrane, extremely severe obstacles exist in the practical application of such method, i.e., the liquid to form a dispersed phase (aqueous phase or 01/W type emulsion) must be dispersing into a continuous fatty phase at high pressure, and pH will vary due to the migration of chemicals (silylation agent) used for the hydrophobic treatment of porous membrane.

Nextly, ordinary means for producing an oil-in-water (O/W) type emulsion by the method according to the prior invention consist of using a hydrophilic porous membrane, adding hydrophilic emulsifying agents to the aqueous phase not to the fatty phase. However, the O/W type emulsion produced in large quantities by such prior invention provides large average particle diameters and large deviations in the particle size, thus causing unstable emulsions.

On the other hand, a low-fat spread is W/O type emulsified states where less oil and fat and more water are contained than the ordinary margarin. An oil-in-water-in-oil type spread is excellent in flavor (especially in that the top flavor and aftertaste develop earlier), and an emulsified state of 01/W/02 type. However, such a low-fat W/O type emulsion, for example, contains much water, and hence it is very difficult to provide stable W/O type emulsion, frequently resulting in unstable emulsified states. For this reason, the aqueous phase can be separated during the storage, or the spread may be subjected to phase inversion during a production process or in transit, substantially reducing its value as product. Moreover, in the 01/W/02 type spread, emulsification is hard to occur by the normal emulsification method, and a problem is generated that two oil phases (01 and 02) become composite.

Accordingly, various techniques have been conventionally developed to keep W/O or 01/W/02 type spread with high water content stable. Most of these techniques relate to the improvement of the constitution of the spread, with virtually few technological developments found as to the method of emulsification. Most emulsification methods are by the normal methods (for instance, stirring by a homo-mixer, ultrasonic methods, etc.). There have been essentially few technological developments intended to associate the stabilization of W/O or 01/W/02 type spread with high water contents with emulsification procedures.

Known as improvements concerning the constitution of W/O or 01/W/02 type spread are, for example, the method for causing specific amounts of di-glyceride, tri-glyceride, and lecithin to be contained as fatty phase components, the one for causing specific amount of protein or macromolecule polysaccharide to be contained as stabilizer (or gelling agent), or the one for adding specific amounts of specific emulsifying agents. Methods for improving fatty phase constituents include those in which lecithin is used in fatty phase (Patent Publication No. 15804/80, Patent Provisional Publication No. 152445/83).

However, of these conventional methods, in the case of the one for specifying fatty phase components, for instance, it is required to make inter esterifications to provide di-glyceride and tri-glyceride, and a method where lecithin is employed as fatty phase uses its excellent ability of emulsification, but the product resulting therefrom has the drawback that the aftertaste is degraded due to undesirable flavor. And in either method, the constituents of a product are limited. In the case of the method for adding protein and macromolecule polysaccharide for stabilization, they adversely affect the taste and fungi or germs are apt to grow.

Furthermore, in the case of the method for adding a specific type of emulsifying agent in a specific amount, a technology has been proposed which has succeeded in improving emulsification stability and aftertaste by using a specific type of emulsifying agent or such agent in a specific blending ratio (Patent Publication No. 15682/79, Patent Publication No. 33294/80, Patent Provisional Publication No. 74540/86). However, if the type and composition of emulsifying agent are limited as by the above method, the physical properties, taste and flavor of the product are restricted.

SUMMARY OF THE INVENTION

An object of the present invention is to provide a hygenic, and new emulsion-producing method which permits efficient production of stable emulsion with uniform particle sizes of a dispersed phase.

Another object of the present invention is to provide methods for producing a stable low-fat spread and a stable oil-in-water-in-oil type spread, which are not limited in the components and kinds of fats and oils (hereinafter referred to as oils) and emulsifying agents, always requires no stabilizers nor gelling agents, and generates no leak or phase inversion.

The present invention provides the following methods for producing emulsions and methods for producing a low-fat spread and an oil-in-water-in-oil type spread.

1. A method for producing a water-in-oil(W/O) type emulsion, which comprises dispersing an aqueous phase at low pressure into a fatty phase through a hydrophilic microporous membrane previously treated with the fatty phase. By the term "treated" or "pretreated", as used throughout this specification, it means "immersing" or "soaking" the microporous membrane in the fatty phase sufficiently so as to render the microporous membrane hydrophobic.
2. A method for producing an oil-in-water-in-oil(01/W/02) type emulsion, which comprises dispersing an oil-in-water(01/W) type emulsion at low pressure into a fatty phase(02) through a hydrophilic microporous membrane previously coated with the fatty phase(02).
3. A method for producing an oil-in-water(O/W) type emulsion, which comprises dispersing a fatty phase containing hydrophobic emulsifying agent into an aqueous phase through a hydrophilic microporous membrane having uniform diameter.
4. A Method for producing a low-fat spread, which comprises rapidly cooling a water-in-oil (W/O) type emulsion prepared by dispersing an aqueous phase into a fatty phase through a microporous membrane to plasticize, and kneading.
5. A method for producing an oil-in-water-in-oil type spread, which comprises rapidly cooling an oil-in-water-in-oil (01/W/02) type emulsion prepared by dispersing an oil-in-water (01/W) type emulsion into a fatty phase (02) through a microporous membrane to plasticize, and kneading.

BRIEF DESCRIPTION OF THE DRAWING

FIG. 1 is a schematic drawing of one example of the device to execute the present invention.

DETAILED DESCRIPTION OF THE INVENTION

On the following pages, more detailed descriptions will be given to each of the aforestated methods.

I. Methods for Producing a W/O Type Emulsion and an 01/W/02 Type Emulsion

For hydrophilic porous membranes used for these methods, not only those known but also arbitrarily selected ones, including vitreous micro porous membranes produced in accordance with the method as described in Example 1 of Japanese Patent No. 1,518,989, or the porous membrane commercially available as the trademark of MPG (sold by Ise Chemical Industry Co. [Japan]) can be employed. These porous membranes can be produced so that they have a given pore diameter between 0.05 and 20 $\mu$m. Porous membranes of desired pore diameters can be used depending on the emulsions intended. In these methods of this invention, it is not always necessary that pore diameters must be uniform.

As the oils for fatty phases (0 or 01 and 02), chemically treated oils, or animal and plant oils can be used in singular or combination, which can be arbitrarily selected according to the objective of a particular emulsion. To these fatty phases, at least 0.05% (weight: the same will hold true unless otherwise specified), and preferably, 0.5 to 3.0% of one or mixtures of more than two of the hydrophobic emulsifying agents, for example, commercially available sorbitan esters of fatty acids, mono and di glycerizes, and sucrose esters of fatty acids are added, and uniformly mixed. The fatty phase can be pasteurized or sterilized as necessary.

The aqueous phase can be prepared by appropriate ordinary methods depending on the objectives of the emulsions produced, for example water itself, aqueous solutions in which various constituents of salt, sodium caseinate, casein hydrolysates, gelatin and other protein, starch, dextrine, plant gumm and other macromolecule polysaccharide are dissolved, skim milk, whey or other substances. It can be pasteurized or sterilized as necessary. For the aqueous phase, at least 0.01%, preferably 0.1 to 0.5% of one or mixtures of more than two of the hydrophilic emulsifying agents, for example, commercially available sucrose esters of fatty acids or polyglycerin ester of fatty acid are added, and can be uniformly mixed before such pasteurization or sterilization.

The ratio of the fatty phase to the aqueous phase of the final product can be set to an appropriate value depending on the objects of emulsions to be produced.

According to the method of the present invention, a W/O type emulsion and an 01/W/02 type emulsion can be produced without limiting the kinds of oil and fat or adding additives other than emulsifying agents. Moreover, the aqueous phase can be dispersed to the fatty phase stably up to high ratio unavailable with the conventional methods beyond 50% of final product.

Then, specific descriptions will be given as to an example of production of a W/O emulsion while referring to drawing attached (FIG. 1).

In a circulation bath (1), a specified amount of fatty phase pasteurized or sterilized as required is stored. The fatty phase is first transferred with a pump (2) through a pipe line (3) to the inside of a porous membrane module (5) equipped with a hydrophilic porous membrane (4), the hydrophilic porous membrane (4) being under a condition in which it pretreated with the fatty phase. Then, emulsification starts from this condition. In other words, the fatty phase in the circulation bath (1) is transferred with the pump (2) through the pipeline (3) to the inside of the hydrophilic porous membrane (4) previously treated with the fatty phase, dispersed with the micro aqueous phase particles passed through the hydrophilic porous membrane (4), and then returns through the pipeline (6) to the circulation bath (1). The circulation flow rate inside the hydrophilic porous membrane (4) of the fatty phase is 0.4 to 5 m/sec., and ordinary can be arbitrarily selected within the range of 0.8 to 2 m/sec.

In a pressure vessel (7), on the other hand, a specified amount of aqueous phase pasteurized or sterilized as necessary is stored. The aqueous phase is pressurized to a specified pressure with inert gas adjusted with a valve (8) and introduced through a pipeline (9) or a pressure pump, passed through a valve (10) and is fed through a pipeline (11) to a porous membrane module (5), and is dispersed into the fatty phase through micro pores of the hydrophilic porous membrane (4). Although the pressure of the aqueous phase depends on the kinds of aqueous solution to be used, particularly the kinds and contents of stabilizers and gelling agents, the kind and quantity of emulsifying agents, and emulsifying temperature, lower pressure is sufficient as compared with when a hydrophobic porous membrane is used according to the ordinary method (less than ½ when a hydrophobic membrane is used). The temperatures of dispersion may be in the range of 0° to 80° C.

The foregoing circulation continues until essentially all aqueous phase is dispersed into the fatty phase. After the completion of emulsification, the water-in-oil type emulsion is transferred through a pipeline (12) to the subsequent process. The emulsion obtained may be pasteurized or sterilized by the ordinary method as necessary.

By the above methods, hygenic and stable W/O type emulsions can be obtained. By using O/W type emulsions instead of the aqueous phase as dispersed phase, 01/W/02 type emulsions can be obtained by the same process.

As above-mentioned, when hydrophilic porous membranes are used, no variations in pH condition of the emulsion obtained can be recognized. In addition, equivalent or higher efficiency of the production of emulsion can be achieved at lower pressure than the method using a conventional hydrophobic porous membrane (prior invention). Use of hydrophilic porous membrane requires no complicated operations, such as complete cleaning of the membrane and hydrophobic treatment for regeneration, required when the conventional method is used, permits emulsification at lower pressure by previously treating the membrane with the oils to be used for the continuous phase, thus providing good operability.

The following is the result of comparisons of the W/O emulsions produced by the methods of the present invention and the conventional methods.

1) Preparation of Samples

Ten kinds of samples, Sample Nos. 1 through 10, were prepared under the conditions as shown in Table 1A and 1B. Sample No. 1 was emulsified by the conventional method for five minutes with the stirrer at 360 rpm. Sample Nos. 2 to 4 were samples emulsified by the conventional membranes with micropores (a hydrophobic porous membranes). Sample No. 5, as a control sample, was emulsified without treating the hydrophilic membranes with the fatty phase. Sample No. 6, as a control sample, was emulsified with the hydrophilic membrane previously treating with the fatty phase at the same emulsifying pressure as a hydrophobic membrane. Sample Nos. 7 to 10 indicate the method of the present invention in which a hydrophilic membrane was used.

2) Experimental Methods

The various samples were measured for particle diameter distribution with a centrifugal particle size distribution analyzer (CAPA500 by HORIBA Co. Ltd. [JAPAN]), for the determination of the average particle diameter (D). For the samples emulsified, the increasing ratio (A) of the mean particle diameter was calculated by the following equation and was used as an indicator of stability of samples.

Increasing ratio $A\ (\%) = 100 \times (D1 - D0)/D0$

Wherein D0 is the mean particle diameter of emulsion immediately after prepared, D1 is the mean particle diameter of emulsion which was allowed to stand at room temperature for one day after prepared.

This means that an emulsion with its A being 0 is under entirely stable and ideal condition (which does not exist actually), and that the more stable emulsions are, the closer A becomes to 0.

3) Results

The results of the test are shown as indicated in Table 1A and 1B.

As becomes apparent from the comparison between Samples 8 and 2, 5, between samples 2 and 6, between samples 3 and 7 and between samples 4 and 8, it was confirmed that when a membrane used is hydrophilic and it is previously treated with an fatty phase, W/O emulsion emulsified at lower pressure (less than ½ when a hydrophobic membrane is used) is as stable as or more stable than the same type emulsion produced by a hydrophobic membrane used under the same condition except that the hydrophilic membrane was previously treated with an fatty phase. In particular, the samples produced by the method of the present invention proved much more stable than Sample 1, which was produced with the stirrer (Conventional method).

Furthermore, when Samples 2 and 9 were compared for the ability to be emulsified, it was found that both used an MPG membrane of a diameter of 10 mm and a length of 240 mm and offered the ability to be emulsified at a ratio of 5 kg/hr, but that the ability to be emulsified by the hydrophilic membrane is as good at lower pressure by the hydrophobic membrane. Virtually similar results were obtained for the samples which were produced by the method of the present invention under different conditions.

In addition, 01/W/02 type emulsions were tested for stability by the method according to the present invention and by the conventional method.

1) Preparation of Samples

Ten kinds of samples, Sample Nos. 1 through 10, were prepared under the conditions as shown in Table 2A and 2B. The preparation procedure of each of the samples are identical to that for the test of the aforestated W/O type emulsions.

2) Experimental Methods

The various samples were evaluated for emulsified state and stability by the following evaluation methods.

(1) Evaluation of emulsified state: The emulsified samples were taken into a measuring cylinder shortly after the emulsification and observed for their emulsified state with naked eyes and with a microscope.

The evaluation criteria will be given below.
  A: emulsified;
  B: left unemulsified partially, forming an aqueous phase;
  C: unemulsified (2) Evaluation of stability: The emulsified samples which had been allowed to stand at 5° C. for one week in the measuring cylinder after the observation at (1), were observed for its emulsified state with the naked eyes, and checked with a microscope to determine whether the oil-in-water-in-oil (01/W/02) type emulsion had been broken.

The evaluation criteria will be shown below.
  a. Stable
  b. The emulsified protion is stable.
  c. The demulsification and syneresis are caused.

3) Results

The results of the test are shown in Table 2A and 2B.

As noted by these tables, it was confirmed that stable 01/W/02 type emulsion can be produced by the method of the present invention.

Additional testing was conducted as to the effect of a hydrophilic porous membrane and a hydrophobic porous membrane on the pH condition of the product as follows:

1) Experimental Methods

One hundred forty milliliter of purified water was put into a cylinder, immersing various MPG membranes (having a diameter of 10 mm and a length of 240 mm) at room temperature for 24 hours. The pH values of the immersing water before and after the immersion were measured with a pH meter.

2) Test Results

The results of this testing was as given below.

|  | pH before immersion | pH after immersion |
| --- | --- | --- |
| Immersing water for hydrophilic membrane | 7.2 | 7.2 |
| Immersing water for hydrophobic membrane | 7.2 | 7.7 |

As noted above, no variation in pH condition can be recognized in the hydrophilic membrane.

II. A Method for Producing an O/W Type Emulsion

In this production method, at least 0.05%, and preferably, 0.5 to 3.0% of one or mixtures of more than two of the hydrophobic emulsifying agents, for example, commercially available sorbitan esters of fatty acids, mono and di glycerizes, and sucrose esters of fatty acids are added to a fatty phase to form a dispersed phase, and uniformly mixed. Except for the above, hydrophilic porous membranes, aqueous phase and fatty phase as described in I. can be used.

Then, specific descriptions will be given as to an example of production of O/W type emulsions while referring to drawings attached (FIG. 1).

In a circulation bath (1), a specified amount of aqueous phase is stored. The aqueous phase is transferred with a pump (2) through a pipe line (3) to the center of a porous membrane module (5) equipped with a hydrophilic porous membrane (4). In this porous membrane module (5), as will be described later, the fatty phase is dispersed into the aqueous phase through the porous membrane (4), then the aqueous phase is returned through the pipeline (6) to the circulation bath (1). The circulation flow rate inside the porous membrane module (5) of the aqueous phase is 0.4 to 5 m/sec., and ordinary can be arbitrarily selected within the range of 0.8 to 2 m/sec.

In a pressure vessel (7), on the other hand, a specified amount of fatty phase is stored. The fatty phase is pressurized to a specified pressure with inert gas adjusted with a valve (8) and introduced through a pipeline (9) or a pressure pump, passed through a valve (10) and is fed through a pipeline (11) to a porous membrane module (5), and is dispersed into the aqueous phases through micro pores of the hydrophilic porous membrane (4). Although the pressures used to pressurize depend on the kinds of fats to be used, the kind, and quantity of emulsifying agents and emulsifying temperature, they normally range from 0.01 to 10.0 kg/cm$^2$, and selected arbitrarily within that range. The temperatures of dispersion may be selected arbitrarily in the range of 0° to 80° C.

The foregoing circulation continues until essentially all fatty phases are dispersed into the aqueous phases. After the completion of emulsification, the O/W type emulsion is transferred through a pipeline (12) to the subsequent process. The emulsion obtained may be pasteurized or sterilized by the ordinary method as necessary.

By the above methods, stable O/W type emulsions with almost uniform particle diameter can be obtained.

The following is the result of comparisons of the O/W emulsions produced by the method of the present invention and the conventional method.

1) Preparation of Samples

Six kinds of samples, Sample Nos. 1 through 6, were prepared under the conditions as shown in Table 3A and 3B. Among them, Sample No. 1 was emulsified with a homogenizer by the conventional method at a pressure of 170 kg/cm$^2$, and Sample No. 2 was emulsified by the conventional methods with microporous membranes by only adding a hydrophilic emulsifying agent to the aqueous phase. Sample Nos. 3 to 6 were emulsified by the method according to the present invention.

2) Experimental Methods

The various samples were measured for particle diameter distribution with a centrifugal particle size distribution analyzer (CAPA500 by HORIBA Co., Ltd. [JAPAN]), for the determination of the average particule diameter (D) and deviation($\alpha$). The deviation is a value determined by deducting the particle diameter ($D_{90}$) when the particle capacity occupies 90% of the whole on a relative cumulative particle diameter distribution curve from the particle diameter ($D_{10}$) when it takes up 10% of the whole, and by dividing the difference with the mean particle diameter. Accordingly, emulsions with α at 0 means an ideal state in which there is no deviation in particles (such state does not exist actually), and the more uniform the particle diameters are, the closer to zero α become.

3) Results

The results of the test are shown as indicated in Table 3A and 3B.

As has become apparent from Table 3A and 3B, Sample Nos. 1 and 2 by the conventional method show larger deviations, and Sample 2 shows a mean particle diameter, approximately double that produced by the method of the present invention.

On the other hand, Samples 3 to 6 by the method of the present invention showed a deviation of less than 1, indicating that uniform particles were obtained. Roughly the same results as mentioned above were obtained as for the samples prepared by the method of the present invention under different conditions.

III. Methods for Producing a Low-Fat Spread and an Oil-in-Water-in-Oil Type Spread This production method is featured by rapidly cooling, and kneading without phase inversion, W/O type or 01/W/02 type emulsion consisting primarily of plastic oils, aqueous solution and emulsifying agents, and being prepared a micro membrane which has micropores, using no specified oils components and emulsifying agent.

There are no limitations to oils comprising the fatty phases in these spreads according to the present invention in terms of constituent and type. For instance, they include rape seed oil, soybean oil, palm oil, palm kernel oil, corn oil, safflower oil, sunflower oil, cotton seed oil, coconut oil, milk fat, fish oil, beef oil, pork oil and other comprehensive kinds of animal and plant oil, and also the processed oil and fat subjected to hydrogenation addition, inter esterification, fractionation and other treatments. They can be employed singularly or in combination. In the case of an oil-in-water-in-oil (01/W/02) type spread, different kinds of oils can be employed as 01 and 02.

In the case of a low-fat spread, the ratio of the fatty phase constitutes 50% and less, especially 20 to 50% of the final product, and in an oil-in-water-in-oil type spread, it constitutes 25% and more (the ratio of 02 preferably 20% and more), preferably 25 to 75% of the final product.

As the aqueous phases for the spreads, water itself to which nothing is added, or the substances obtained by dissolving and dispersing starch, process starch, protein, sugars, microorganism-derived polysaccharide, seasoning, salt, and milk products in water can be arbitrarily used. The concentration of a total of stabilizer and gelling agent in the aqueous phase is between 0 and 15%.

To the kinds of the emulsifying agents constituting the spreads of the present invention, no special limitations are imposed, except that they must be edible. They include sucrose esters of fatty acids, sorbitan esters of fatty acids, mono and di glycerizes (including polyglycerin estes of fatty acid), polyglycerin ester of condensed recinoleic acid, and polyglycerin ester of condensed 12-hydroxystearic acid. These can be used singularly or in combination or the mixture containing them at a ratio of 0.01 to 5.0% with regard to the spreads.

The porous membrane with micropore size used for the method of the present invention is publicly known, including alumina ceramics membrane, vitreous microporous membrane (produced by the method as described in Japanese Patent No. 1,518,989), and commercially available MPG (for MICROPOROUS GLASS; trademark; made by Ise Chemical Industry Co. [JAPAN]) membrane. These membranes can be produced to a given pore diameter ranging normally from 0.05 to 20 μm, and can be arbitrarily used depending on the emulsion to be obtained. In the present invention, it is not always necessary that pore diameters are uniform.

No special limitations are imposed on the rapid cooling and kneading units to be employed for the method according to the present invention. Any of the known rapidly cooling and kneading units (votator, perfector, combinator and the like) can be used.

When a low-fat spread, for example, is produced by the method according to the present invention, first, a W/O type emulsion is prepared in accordance with the schematic drawing of the process as illustrated in FIG. 1. In the case of using a hydrophilic porous membrane (4), emulsification starts after the hydrophilic porous membrane (4) is previously treated with fatty phase. When a hydrophobic membrane (4) is employed, on the other hand, emulsification is performed by the ordinary method.

By rapidly cooling and kneading the stable W/O type emulsion thus obtained at a cooling temperature of 5° to 20° C. with a rapidly cooling unit and a kneading unit, a W/O type low-fat spread can be produced which remain stable after storage and provide smooth taste. An 01/W/02 type spread can be produced in the same process as aforestated, by employing an 01/W type emulsion as a dispersed phase.

Then, the results of the test for the stability of a W/O type spread produced by various emulsifying procedures will be shown.

1) Preparation of Samples

Four kinds of samples at Sample Nos. 1 to 4 were prepared by the method, conditions and in compositions as indicated in Table 4A and 4B, and were subjected to rapidly cooling to 5° C. and kneading, using a rapidly cooling and kneading unit (Pilot Combinator; made by Schuröder, [Germany]), giving four kinds of spread samples.

Sample No. 1: Spread sample prepared by emulsifying for 30 minutes, by the conventional method with a stirrer at 360 rpm, rapidly cooled, kneaded and produced.

Sample No. 2: Spread sample prepared by emulsifying for 5 minutes by the conventional method with a homo-mixer rotation at 10,000 rpm, rapidly cooled, kneaded and produced.

Sample No. 3: Spread sample prepared by emulsifying using a hydrophilic membrane with an average pore diameter of 0.5 μm, rapidly cooled, kneaded and produced.

Sample No. 4: Spread sample prepared by emulsifying using a hydrophobic membrane with an average pore diameter of 3.0 μm, rapidly cooled, kneaded and produced.

2) Experimental Methods (1) Surface condition

The various spread samples were stored at −25° C. or 5° C. for overnight immediately the production and after allowed to stand at 25° C. for seven days, and they were evaluated in accordance with the following criteria while observing the surface conditions and the separation conditions of the aqueous phase.

A: The surface condition of the spread sample is smooth and no separation of the aqueous phase is found.
B: The surface condition of the spread sample is a little rough, and water drops can sometimes be found.
C: The surface condition of the spread sample is a little rough, and water drops can always be found.
D: The surface condition of the spread sample is rough, and the separation of the aqueous phase can be found.

(2) Organoleptic Tests

The various spread samples were stored at 5° C. overnight, and put to organoleptic tests by the panel consisting of 40 persons (20 men and 20 women), evaluated in accordance with the following criteria.
a: Smooth
b: Rough
c: Easily meltable in the mouth
d: Poorly meltable in the mouth

(3) Mean particle size of emulsions

The samples were measured for particle diameter distribution with a centrifugal particle size distribution analyzer (CAPA500 made by HORIBA Co. Ltd. [JAPAN]), to determine the mean particle diameter.

(4) Results

The results of this test are shown in Table 4A and 4B. As sample No. 2 was caused a phase inversion during the production process, so it was not carried out the test. The mean particle diameters of Sample Nos. 3 and 4 were one-fourth and one-third smaller than that of Sample No. 1, indicating the sign of the emulsified matter being stable and of their tasting smooth. In fact, the stabilities of Sample Nos. 3 and 4 were better than that of Sample No. 1 both immediately after the production and after the storage. The tastes of Sample Nos. 3 and 4 were conspicuously more excellent than that of Sample No. 1. Accordingly, Sample Nos. 3 and 4 by the method of the present invention were recognized as by far better products than Sample Nos. 1 and 2.

Similar results were obtained when these samples were tested under different conditions and in different compositions.

Then, the results of the testing conducted to determine the scope of the optimum ratio of the fatty phase to the final product in W/O type low-fat spread according to the present invention will be shown below.

1) Preparation of Samples

Using hydrophilic membranes, three kinds of samples ranging from Sample Nos. 1 to 3 were prepared under the conditions as described in Table 5, and were rapidly cooling to 5° C. and kneading with a rapidly cooling/kneading unit (Pilot Combinator: made by Schuröder, [Germany]), to give three kinds of spread samples.

2) Experimental Methods

The various spread samples were tested for stability by storing them at 5° C. overnight and allowing them to stand at 25° C. for seven days, and for their surface conditions and aqueous phase separation conditions under the same procedures as in the above test. Moreover, they were tested for taste under the same procedure as in the above test.

3) Results

The results of the test are shown in Table 5. The stability of Sample Nos. 1 and 2 are superior to that of Sample No. 3, indicating that the desirable ratio of the fatty phase to the final product is 20% or higher. When that ratio of the fatty phase to the final product is more than 50%, it is known that stable spreads with better taste can be obtained even by the conventional method.

Then, descriptions will be made as to the test for the stability of 01/W/02 type spread by various emulsification methods.

1) Preparation of Samples

According to the method, condition and composition as described in Table 6, four kinds of emulsified samples ranging from Sample Nos. 1 to 4 were prepared, and subjected to rapidly cooling to 5° C. by use of rapidly cooling and kneading device (Pilot Combinator: made by Schröder, [Germany]) and kneading, to prepare four kinds of spreads.

Sample No. 1: Spread sample produced by adding an oil-in-water (01/W) type emulsion to the fatty phase (02) by the conventional method, putting it to a 30-min. emulsification at 360 rpm with a stirrer, and to a rapidly cooling and kneeding.

Sample No. 2: Spread sample produced by adding an oil-in-water (01/W) type emulsion to 02 by the conventional method, putting it to a 5-min. emulsification at 10,000 rpm with a homo-mixer, and then to rapidly cooling and kneading.

Sample No. 3: Spread sample produced by emulsifying an 01/W emulsion with 02 using a hydrophilic microporous membrane with an average pore diameter of 3.0 μm, putting it to a rapidly cooling and kneading.

Sample No. 4: Spread sample produced by emulsifying an 01/W emulsion with 02 using a hydrophobic microporous membrane with an average pore diameter of 5.0 μm, putting it to a rapidly cooling and kneading.

2) Experimental Methods

(1) Surface Condition

The various spread samples were stored at 5° C. overnight, allowed to stand at 25° C. for seven days, observed for the surface conditions and aqueous phase separation condition therefor, and evaluated in accordance with the following criteria.

A: The surface condition of the spread sample is smooth, and no separation of the aqueous phase can be found.
B: The surface condition of the spread sample is a little rough, and water drops can sometimes be found.
C: The surface condition of the spread sample is rough, and some water separation can be found.

(2) Stability of 01/W/02 type spread

The various spread samples were stored at 5° C. overnight, and observed with a phase contrast microscope (magnification 200 times) to determine the quantity ratio of 01/W type emulsified particle and water type emulsified particle in 02 within a specified range of vision (300 μm × 300 μm). It can be evaluated that the higher the ratio of 01/W type emulsified particle, the more stable the 01/W/02 type emulsified state.

X: The ratio of the 01/W type emulsified particle in 02 is 70% and more, and 01/W/02 condition is stable.

Y: The ratio of the O1/W type emulsified particle in O2 is less than 70%, and O1/W/O2 condition is unstable.

3) Organoleptic Test

The various spread samples were stored at 5° C. overnight, and put to a organoleptic test for the taste thereof by the panel of men and women, 20 each, and evaluated in accordance with the following criteria.
a: smooth.
b: rough.
c: easily meltable in the mouth.
d: poorly meltable in the mouth.
e: the top flavor and after taste are strong.
f: the top flavor and after taste are weak.

O1/W type emulsified particles in O2 within a specific scope of vision were confirmed with a phase-contrast microscope (magnification 200 times), and the average particle diameter was calculated by determining the diameters of the O1/W type particles.

(4) Results

The results of the test are indicated in Table 6. Sample No. 2 was subjected to a phase inversion during the production, rending it impossible to perform the test. The average particle diameters of the emulsions of Sample Nos. 3 and 4 were as small as approximately one-fifth and one-half of that of Sample No. 1, indicating that the former were more stable and offered smoother taste. In fact, the stabilities of Sample Nos. 3 and 4 were more excellent than that of Sample No. 1. The tastes of Samples Nos. 3 and 4 were remarkably more excellent than that of Sample No. 1. Accordingly, it was recognized that Sample Nos. 3 and 4 are much better products than Sample Nos. 1 and 2. Roughly similar results were obtained even if testing were performed under different conditions and compositions.

Next, the results of the test conducted to determine the scope of the optimum ratio of fatty phases (O1 and O2) to the final product of an oil-in-water-in-oil type spread will be shown below:

1) Preparation of Samples

Using hydrohilic membranes, O1/W type emulsion was dispersed into O2 phase through a membrane in accordance with the sample preparation methods of Sample Nos. 3 and 4 in the above test and various emulsified samples were prepared. They were put to a 5° C. rapidly cooling and kneading using a rapidly cooling and kneading device (Pilot Combinator, made by Schuröder, [Germany]), preparing three kinds of spread samples.

2) Experimental Methods

The various spread samples were examined for the surface condition, aqueous phase separation condition and taste thereof by the same procedure as in the above test.

3) Results

The results of the test are shown in Table 7. The stability of Sample Nos. 5 and 6 were more excellent than that of Sample No. 7, indicating that a preferable ratio of fatty phase to the final product is 25% and more. If the ratio of fatty phase of the O2 phase is less than 20%, there occurred no emulsification, generating no spread. Though testing was conducted with the O2 phase as a desirable ratio of fatty phase of 20% and more and varying the ratio of the O1 phase, it was confirmed that if the total of the O1 phase and the O2 phase was 25% and more, stability could be ensured.

Finally, the results of the testing conducted to determine the scope of the optimum ratio of stabilizers and gelling agents in aqueous phases of W/O type low-fat spread according to the present invention will be shown below.

1) Preparation of Samples

Using hydrophilic membranes, eleven kinds of samples ranging from Sample Nos. 1 to 11 were prepared under the conditions as described in Table 8, and were rapid cooling to 5° C. and kneading with a rapidly cooling/kneading unit (Pilot Combinator: made by Schuröder, [Germany]), to give eleven kinds of spread samples.

2) Experimental Methods

Testing was conducted using the same method as in the above test.

3) Results

The results of this testing are shown in Table 8.

The test results showing the stability and taste of Sample No. 1 in Table 8 and Sample No. 2 in Table 5 which is lower in the ratio of the fatty phases than Sample Nos. 1 to 11, indicate that stable low-fat spreads with excellent taste can be obtained without adding stabilizers and gelling agents to the aqueous phase (even though the concentrations of stabilizers and gelling agents in the aqueous phase are zero).

The test results showing the stability and taste of the spreads at Sample Nos. 2 to 6 indicate that these effects are not affected by kinds of stabilizers and gelling agents. Accordingly, in the tests designed to determine desirable ratios of stabilizers and gelling agents in the aqueous phase (Sample Nos. 7 to 11), casein and xanthan gum were used.

The taste of Sample Nos. 7 to 9 offer better than of Sample Nos. 10 and 11, indicating that the desirable ratio of stabilizers and gelling agents in the aqueous phase is 15% and less. For Sample Nos. 8 and 11, the same ratio of casein and xanthan gum were added for the testing.

Virtually the same results as above mentioned were obtained with the oil-in-water and the oil-in-water-in-oil type spread prepared by the method of the present invention under different conditions.

EFFECTS OF THE INVENTION

The effects achieved by the present invention are as follows:

(1) Stable and hygenic W/O type, O1/W/O2 type and O/W type emulsions can be produced in an easy operation and at a lower cost.
(2) In a production method of W/O type low-fat spread and O1/W/O2 type spread, it is possible to reduce the ratio of the fatty phase in the whole compositions to 20% for the W/O type spread and 25% for the O1/W/O2 type spread without using stabilizers and gelling agents as essential ingredients. Nevertheless, stable spreads can be obtained.

Since there are no restrictions on oils, the composition and type of emulsifing agent and no stabilizers nor gelling agent are essential constituents, spreads with no restrictions imposed on compositions and good flavor can be obtained.

Specific descriptions will be made as to the present invention by illustrating examples. However, the present invention is not limited to the following examples.

EXAMPLE 1

Production of a W/O Type Emulsion

Polyglycerin ester of condensed recinoleic acid (made by Sakamoto Pharmacutical Industry Co. [JAPAN]) was added at a rate of 2.0% to 5.0 kg commercially available corn oil (made by Taiyo Fats and Oils Co. [JAPAN]) and mixed uniformly to prepare the fatty phase. For the aqueous phase, 5.0 kg water was prepared with no additives in it. In a schematic drawing illustrating the process as FIG. 1, using an MPG module mounted with a hydrophilic membrane with a pore diameter of 0.5 μm (made by Ise Chemical Industry Co. [JAPAN]), after the inside of the MPG is previously treated with the fatty phase, the aqueous phase in a pressure vessel were pressurized to 0.03 kg/cm$^2$ with a pressure pump and dispersed in the fatty phase circulating at a flow rate of 1 m/sec. at room temperature to give approximately 9.7 kg water-in-oil emulsion.

Measurements of the water-in-oil emulsion obtained for the mean particle diameter immediately after the emulsification thereof and one day after they were allowed to stand at room temperature after the emulsification, indicated a 10.5% increase rate of the average particle diameter and that the emulsion was extremely stable.

EXAMPLE 2

Production of Another W/O Type Emulsion

Three kilograms, respectively, of commercially available soybean oil and rape seed oil (both by Taiyo Fats and Oils Co. [JAPAN]) were mixed, and sucrose esters of fatty acids (by Daiichi Kogyo Pharmaceutical Co. [JAPAN]) and polyglycerin ester of condensed recinoleic acids (by Sakamoto Pharmaceutical Industry Co. [JAPAN]) were added to this mixture at a rate of 0.5% and 1.5%, respectively, to this mixture, and mixed uniformly to prepare the fatty phase. Salt was added and dissolved at a rate of 1.6% to 9.0 kg water to prepare the aqueous phase. In a FIG. 1, using an MPG module mounted with a hydrophilic membrane with a pore diameter of 3.0 μm (made by Ise Chemical Industry Co.), after the inside of the MPG was previously treated with the fatty phase, the aqueous phase in a pressure vessel was pressurized to 0.01 kg/cm$^2$ with a nitrogen gas and dispersed in the fatty phase circulating at a flow rate of 1.5 m/sec. at 60° C. to give approximately 14.8 kg water-in-oil emulsion.

Measurements of the water-in-oil emulsions obtained with the same procedure as in Example 1 indicated a 11.1% increase rate of the average particle diameter and that the emulsion was extremely stable.

EXAMPLE 3

Production of an O1/W/O2 Type Emulsion

Polyglycerin ester of condensed recinoleic acids (by Sakamoto Pharmacutical Industry Co. [JAPAN]) was added at a rate of 2.0% to 5.0 kg commercially available corn oil (by Taiyo Fats and Oils Co. [JAPAN]) and mixed uniformly to prepare the fatty phase (02). The mixture obtained by adding sorbitan esters of fatty acids (by Kao Co. [JAPAN]) at a rate of 2.0% to 0.5 kg commercially available corn oil (by Taiyo Fats and Oils Co. [JAPAN]) and the one obtained by adding sucrose esters of fatty acids (by Daiichi Kogyo Pharmaceutical Co. [JAPAN]) at a rate of 0.3% to 4.5 kg water, were mixed uniformly and heated to 60° C., then a homogenizer (Manton-Gaulin, [Germany]) was used to prepare 5.0 kg of oil-in-water (01/W) type emulsion treated at an emulsifying pressure of 170 kg/cm$^2$. In FIG. 1, using an MPG module mounted with a hydrophilic membrane with a pore diameter of 4.2 μm (made by Ise Chemical Industry Co.), after the inside of the MPG was previously treated with the fatty phase (02), the oil-in-water (01/W) type emulsion in a pressure vessel was pressurized to 0.04 kg/cm$^2$ with a pressure pump and dispersed into the fatty phase (02) circulating at a flow rate of 1 m/sec. at room temperature to give some approximately 9.7 kg oil-in-water-in-oil (01/W/02) type emulsion.

Evaluation of the oil-in-water-in-oil (01/W/02) type emulsion, based on similar evaluation criteria as in the foregoing tests in terms of the emulsified state and stability, indicated that the emulsified state was good and the emulsion was extremely stable.

EXAMPLE 4

Production of Another 01/W/02 Type Emulsion

Three kilograms, respectively, of commercially available soybean oil and rape seed oil (both by Taiyo Fats and Oils Co. [JAPAN]) were mixed, and sucrose esters of fatty acids (by Daiichi Kogyo Pharmaceutical Co. [JAPAN]) and polyglycerin ester of condensed recinoleic acid (by Sakamoto Pharmacutical Industry Co. [JAPAN]) were added at a rate of 0.5% and 1.5%, respectively, to this mixture, and mixed uniformly to prepare the fatty phases (02). The mixture obtained by mixing commercially available soybean oil and rape seed oil (both by Taiyo Fats and Oils Co. [JAPAN]) 0.25 kg each, adding sucrose esters of fatty acids (by Daiichi Kogyo Pharmaceutical Co.) and polyglycerin ester of condensed recinoleic acid (by Sakamoto Pharmaceutical Industry) at a rate of 0.5% and 1.5%, respectively, to the soybean oil/rape seed oil mixture and the one obtained by adding sucrose esters of fatty acids (by Daiichi Kogyo Pharmaceutical Co.) and salt at a rate of 0.2% and 1.6%, respectively, to 8.5 kg water, were mixed uniformly and heated to 60° C., then a highpressure homogenizer (Manton-Gaulin[Germany]) was used to prepare 9.0 kg oil-in-water (01/W) type emulsion treated at an emulsifying pressure of 500 kg/cm$^2$. In FIG. 1, using an MPG module mounted with a hydrophilic membrane with a pore diameter of 3.0 μm (made by Ise Chemical Industry Co.), after the inside of the MPG is previously treated with the fatty phase (02), the oil-in-water (01/W) type emulsion in a pressure vessel was pressurized to 0.02 kg/cm$^2$ with a nitrogen gas and dispersed into the fatty phase (02) circulating at a flow rate of 1.5 m/sec. at 60° C. to give approximately 14.8 kg oil-in-water-in-oil (01/W/02) type emulsion.

Testing the oil-in-water-in-oil (01/W/02) type emulsion under the same procedures as in Example 3, indicated that the emulsified state was good and that the emulsion was extremely stable.

EXAMPLE 5

Production of a O/W Type Emulsion

Sucrose esters of fatty acids (by Daiichi Kogyo Pharmaceutical Co.) was added at a rate of 0.3% to 2 kg water and dissolved while heated, to prepare an aqueous phase. Sorbitan esters of fatty acids (by Kao Co.

HLB 4.3) at a rate of 0.5% to 0.4 kg commercially available corn oil (by Taiyo Fats and Oils Co.), and mixed uniformly to prepare the fatty phase. In a FIG. 1, using a porous membrane module mounted with a hydrophilic porous membrane with a pore diameter of 0.7 μm (made by Ise Chemical Industry Co.), the fatty phase in a pressure vessel was pressurized to 1 kg/cm² with a nitrogen gas and dispersed in the aqueous phase circulating at a flow rate of 2 m/sec. at room temperature to give approximately 2.3 kg oil-in-water emulsion. Measurements of the oil-in-water emulsion obtained for their particle diameter distribution to determine the mean particle diameter and deviation ($\alpha$), indicated that the mean particle diameter was 2.8 μm and deviation ($\alpha$) was 0.92. This means that the particles were extremely uniform.

EXAMPLE 6

Production of Another O/W Type Emulsion

Sucrose esters of fatty acids (by Daiichi Kogyo Pharmaceutical Co.; HLB 15) was added at a rate of 0.2% to 4 kg skim milk and dissolved while heated, to prepare an aqueous phase. Sorbitan esters of fatty acids (by Kao Co. HLB 4.3) were added at a rate of 2.9% to 0.8 kg commercially available corn oil (by Taiyo Fats and Oils Co.), and mixed uniformly to prepare a fatty phase. In FIG. 1, using an porous membrane module mounted with a hydrophilic porous membrane with a pore diameter of 0.5 μm (made by Ise Chemical Industry Co.), the fatty phase in a pressure vessel was pressurized to 0.9 kg/cm² with a nitrogen gas and dispersed in the aqueous phase circulating at a flow rate of 1 m/sec. at room temperature to give approximately 4.5 kg oil-in-water emulsion.

Measurements of the oil-in-water emulsions obtained under the same procedure as in Example 5 indicated that the mean particle diameter was 1.8 μm and deviation ($\alpha$) was 0.92. This means that the particles were extremely uniform.

EXAMPLE 7

Production of Another O/W Type Emulsion

Sucrose esters of fatty acids (by Daiichi Kogyo Pharmaceutical Co.; HLB 15) was added at a rate of 0.1% to 4 kg skim milk and dissolved while heated, to prepare an aqueous phase. Mono and di glycerizes (by Kao Co.; HLB 3.8) and sorbitan esters of fatty acids (by Kao Co. HLB 4.3) were added at a rate of 1.0% and 2.0%, respectively, to 0.8 kg commercially available butter oil (made in New Zealand), and mixed uniformly to prepare a fatty phase. In FIG. 1, using a porous membrane module mounted with a hydrophilic porous membrane with a pore diameter of 0.5 μm (made by Ise Chemical Industry Co.), a fatty phase in a pressure vessel was pressurized to 0.3 kg/cm² with a pressure pump and dispersed in the aqueous phase circulating at a flow rate of 0.8 m/sec. at 60° C. to give approximately 4.5 kg oil-in-water emulsion.

Measurements of the oil-in-water emulsion obtained under the same procedure as in Example 5 indicated that the mean particle diameter was 2.1 μm and dispersion ($\alpha$) was 0.85. This means that the particles were extremely uniform.

EXAMPLE 8

Production of a Low-Fat Spread

One half kilograms commercially available soybean oil and the same quantity of commercially available palm oil (both by Taiyo Fats and Oils Co. [JAPAN]) were mixed, and polyglycerin ester of condensed recinoleic acid (by Sakamoto Pharmaceutical Industry Co.) was added at a rate of 2.0% to this mixture, and mixed uniformly to prepare a fatty phase. Salt was added at a rate of 1.6% to 12.0 kg water and dissolved to prepare an aqueous phase. The aqueous phase was dispersed into the fatty phase using a porous membrane module mounted with a hydrophilic membrane with a pore diameter of 0.5 μm, (by Ise Chemical Industry Co.), and emulsified to give approximately 14.8 kg W/O type emulsion. Then, this emulsion was heated and pasteurized at 85° C. for 10 min., and rapidly cooling to 20° C. and kneading with a rapidly cooling and kneading unit (Pilot Combinator, Schuröder, [Germany]), giving about 14.5 kg low-fat spread.

Testing this low-fat spread under the same procedure as the foregoing test for the stability of spreads, indicated that it was stable and free from aqueous phase separation, that it tasted smooth and easily meltable in the mouth.

EXAMPLE 9

Production of Another Low-Fat Spread

Two kilograms of commercially available soybean oil and the same quantity of commercially available corn oil (both by Taiyo Fats and Oils Co. [JAPAN]) were mixed, and sucrose esters of fatty acids (by Daiichi Kogyo Pharmaceutical Co.) and polyglycerin ester of condensed recinoleic acid (by Sakamoto Pharmaceutical Industry Co.) were added at a rate of 0.5% and 1.5%, respectively, to this mixture, and mixed uniformly to prepare a fatty phase. Salt and xanthan gum were added at a rate of 1.6% and 0.2%, respectively, to 10.0 kg water and dissolved to prepare an aqueous phase. The aqueous phase was dispersed into the fatty phase using a porous membrane module mounted with a hydrophilic membrane with a pore diameter of 7.8 μm (by Ise Chemical Industry Co.), and emulsified to give approximately 13.8 kg W/O type emulsion. Then, this emulsion was heated and pasteurized at 85° C. for 10 minutes, and rapidly cooling to 10° C. and kneading with a rapidly cooling and kneading unit (Pilot Combinator, Schuröder, [Germany]), giving about 13.5 kg low-fat spread.

Testing this low-fat spread under the same procedure as in Example 8 indicated that it was stable and free from aqueous phase separation, that it tasted smooth and extremely easily meltable in the mouth.

EXAMPLE 10

Production of an Oil-In-Water-In-Oil Type Spread

One half kilograms, respectively, of commercially available soybean oil and the same quantity of commercially available palm oil (Taiyo Fats and Oils Co. [JAPAN]) were mixed, and polyglycerin ester of condensed recinoleic acid (by Sakamoto Pharmaceutical Industry Co.) was added at a rate of 2.0% to this mixture, and mixed uniformly to prepare an outermost fatty phase (02). The mixture obtained by mixing soybean oil and palm oil (Taiyo Fats and Oils Co. [JAPAN]) 0.5 kg each, adding sorbitan esters of fatty acids (by Kao Co.) at rate of 2.0% to the soybean oil/palm oil mixture, and the one obtained by adding sucrose esters of fatty acids (Daiich Kogyo Pharmaceutical Co.) and salt at a rate of 0.3% and 1.5%, respectively, to 11.0 kg water, were mixed uniformly and heated to 60° C. The thus obtained mixture was homogenized and treated at an emulsifying pressure of 170 kg/cm² by a homogenizer (Manton-Gaulin [Germany]) to prepare 12.0 kg oil-in-water type emulsion. This 01/W type emulsion was dispersed into the outermost fatty phase (02) using a porous membrane module mounted with a hydrophilic membrane with a pore diameter of 5.0 μm, (by Ise Chemical Industry Co.), and emulsified to give approximately 14.8 kg 01/W/02 type emulsion. Then, this emulsion was heated and pasteurized at 85° C. for 10 min. and rapidly cooling to 20° C. and kneading with a rapidly cooling and kneading unit (Pilot Combinator, Schuröder, [Germany]), giving about 14.5 kg oil-in-water-in-oil type spread.

Testing this spread under the same procedure as in Example 8 indicated that it was stable and free from water phase separation, that it tasted smooth and easily meltable in the mouth, and offers strong creamy taste.

EXAMPLE 11

Production of Another Oil-In-Water-In-Oil Type Spread

Two kilograms, respectively, of commercially available soybean oil and corn oil (Taiyo Fats and Oils Co.) were mixed, and sucrose esters of fatty acids (Daiich Kogyo Pharmaceutical Co.) and polyglycerin ester of condensed recinoleic acid (Sakamoto Pharmaceutical Industry Co.) were added at a rate of 0.5% and 1.5%, respectively, to the mixture, and mixed uniformly to prepare an outermost fatty phase (02). The mixture obtained by mixing soybean oil and corn oil (Taiyo Fats and Oils Co.) 0.5 kg each, adding sucrose esters of fatty acids and polyglycerin ester of condensed recinoleic acid (Daiich Kogyo Pharmaceutical Co.) at a rate of 0.5% and 1.5%, respectively, to the soybean oil/corn oil mixture, and the one obtained by sucrose ester of fatty acids (Daiich Kogyo Pharmaceutical Co.), sodium caseinate and salt at a rate of 0.3%, 0.5% and 1.5%, respectively, to 9.0 kg water, were mixed uniformly and heated to 60° C. The thus obtained mixture was homogenized and treated at an emulsifying pressure of 500 kg/cm² by a highpressure homogenizer (Manton-Gaulin [Germany]) to prepare 10.0 kg oil-in-water type emulsion. This 01/W type emulsion was then dispersed into the outermost fatty phase (02) using a porous membrane module mounted with a hydrophobic membrane (by Ise Chemical Industry Co.) with a pore diameter of 7.8 μm, and emulsified to give approximately 13.8 kg 01/W/02 type emulsion. Then, this emulsion was heated and pasteurized at 85° C. for 10 min, and rapidly cooling to 20° C. and kneading with a rapidly cooling and kneading unit (Pilot Combinator, Schuröder, [Germany]), giving about 13.5 kg oil-in-water-in-oil type spread.

Testing this spread under the same procedure as in Example 8 indicated that it was stable and free from water phase separation, that it tasted smooth and easily meltable in the mouth, and offers strong creamy taste.

TABLE 1A

| Division | Sample No. | Method of emulsification | Micropore diameter (μm) | Emulsifying pressure or rpm (kg/cm²) | Emulsifying temperature (°C.) | Treatment with fatty phases |
|---|---|---|---|---|---|---|
| Conventional method | 1 | Stirrer | — | Emulsified at 360 rpm for 5 min | 60 | Non |
| | 2 | MPG hydrophobic membrane | 3.0 | 0.1 | 60 | Non |
| | 3 | MPG hydrophobic membrane | 3.0 | 0.05 | 60 | Non |
| | 4 | MGP hydrophobic membrane | 3.0 | 0.03 | 60 | Non |
| Control | 5 | MGP hydrophilic membrane | 3.0 | 0.03 | 60 | Non |
| | 6 | MPG hydrophilic membrane | 3.0 | 0.1 | 60 | Treated |
| Present invention | 7 | MPG hydrophilic membrane | 3.0 | 0.05 | 60 | Treated |
| | 8 | MPG hydrophilic membrane | 3.0 | 0.03 | 60 | Treated |
| | 9 | MPG hydrophilic membrane | 3.0 | 0.01 | 60 | Treated |
| | 10 | MPG hydrophilic membrane | 0.5 | 0.03 | 60 | Treated |

TABLE 1B

| Division | Sample No. | Emulsified composition Aqueous phase (Water) (%) | Emulsified composition Fatty phase (Note 1) (%) | Amount of emulsifying agent to be added to fatty phase (%/Oil) (Note 2) | Stability of emulsion (increasing ratio in mean particle diameter) (A) (%) |
|---|---|---|---|---|---|
| Conventional | 1 | 60 | 40 | 2.5 | 50.2 |

TABLE 1B-continued

| Division | Sample No. | Emulsified composition Aqueous phase (Water) (%) | Fatty phase (Note 1) (%) | Amount of emulsifying agent to be added to fatty phase (%/Oil) (Note 2) | Stability of emulsion (increasing ratio in mean particle diameter) (A) (%) |
|---|---|---|---|---|---|
| method | 2 | 60 | 40 | 2.5 | 10.7 |
|  | 3 | 60 | 40 | 2.5 | Not emulsified |
|  | 4 | 60 | 40 | 2.5 | Not emulsified |
| Control | 5 | 60 | 40 | 2.5 | Not emulsified |
|  | 6 | 60 | 40 | 2.5 | Partial separation of aqueous phase |
| Present | 7 | 60 | 40 | 2.5 | 11.3 |
| invention | 8 | 60 | 40 | 2.5 | 11.1 |
|  | 9 | 60 | 40 | 2.5 | 10.5 |
|  | 10 | 60 | 40 | 2.5 | 10.6 |

Note 1 Fatty phase: a mixture in which rape seed oil and soybean oil are mixed in the same quantity.
Note 2 Emulsifying agent: a mixture in which sucrose esters of fatty acid and polyglycerin ester of condensed recinoleic acid are mixed in the same quantity.

TABLE 2A

| Division | Sample No. | Method of emulsification | Micropore diameter (μm) | Emulsifying pressure or rpm (kg/cm²) | Emulsifying temperature (°C.) | Treatment with 02 phase |
|---|---|---|---|---|---|---|
| Conventional method | 1 | Stirrer | — | Emulsified at 360 rpm for 5 min | 60 | Non |
|  | 2 | MPG hydrophobic membrane | 3.0 | 0.12 | 60 | Non |
|  | 3 | MPG hydrophobic membrane | 3.0 | 0.06 | 60 | Non |
|  | 4 | MGP hydrophobic membrane | 3.0 | 0.04 | 60 | Non |
| Control | 5 | MGP hydrophilic membrane | 3.0 | 0.04 | 60 | Non |
|  | 6 | MPG hydrophilic membrane | 3.0 | 0.12 | 60 | Treated |
| Present Invention | 7 | MPG hydrophilic membrane | 3.0 | 0.06 | 60 | Treated |
|  | 8 | MPG hydrophilic membrane | 3.0 | 0.04 | 60 | Treated |
|  | 9 | MPG hydrophilic membrane | 3.0 | 0.02 | 60 | Treated |
|  | 10 | MPG hydrophilic membrane | 4.2 | 0.04 | 60 | Treated |

TABLE 2B

| Division | Sample No. | Emulsified composition (%) 01 Phase (Note 1) | W Phase (Water) | 02 Phase (Note 1) | Amount of emulsifying agents to be added 01 and 02 Phase (Note 2: %/Oil) | W Phase (Note 3: %/Water) | Emulsified state of emulsified sample | Stability of emulsified sample |
|---|---|---|---|---|---|---|---|---|
| Conventional | 1 | 6 | 60 | 34 | 2.0 | 0.3 | A | c |
| method | 2 | 6 | 60 | 34 | 2.0 | 0.3 | A | a |
|  | 3 | 6 | 60 | 34 | 2.0 | 0.3 | C | — |
|  | 4 | 6 | 60 | 34 | 2.0 | 0.3 | C | — |
| Control | 5 | 6 | 60 | 34 | 2.0 | 0.3 | C | — |
|  | 6 | 6 | 60 | 34 | 2.0 | 0.3 | B | b |
| Present | 7 | 6 | 60 | 34 | 2.0 | 0.3 | A | a |
| Invention | 8 | 6 | 60 | 34 | 2.0 | 0.3 | A | a |
|  | 9 | 6 | 60 | 34 | 2.0 | 0.3 | A | a |
|  | 10 | 6 | 60 | 34 | 2.0 | 0.3 | A | a |

Note 1 Fatty Phases (01 & 02): Corn oil
Note 2 Emulsifying agent: a mixture in which sucrose esters of fatty acids and polyglycerin ester of condensed recinoleic acid are mixed in the same quantity.
Note 3 Emulsifying agent: sucrose esters of fatty acids.

TABLE 3A

| Division | Sample No. | Micropore diameter (μm) | Emulsifying pressure (kg/cm²) | Emulsifying temperature (°C.) | Emulsified composition Aqueous phase | Emulsified composition Fatty phase |
|---|---|---|---|---|---|---|
| Conventional method | 1 | — | 170 | Room temperature | Water | Corn oil |
| | 2 | 0.7 | 1.1 | Room temperature | Water | Corn oil |
| Present invention | 3 | 0.7 | 1.0 | Room temperature | Water | Corn oil |
| | 4 | 0.5 | 0.2 | 60 | Skim milk | Butter oil |
| | 5 | 0.5 | 0.3 | 60 | Skim milk | Butter oil |
| | 6 | 0.5 | 0.1 | 60 | Skim milk | Butter oil |

TABLE 3B

| Division | Sample No. | Emulsifying agent Fatty phase Kind | Emulsifying agent Fatty phase Amount to be added (%) | Emulsifying agent Aqueous phase Kind | Emulsifying agent Aqueous phase Amount to be added (%) | Emulsion particle distribution Mean particle diameter (μm) | Emulsion particle distribution Deviation (α) |
|---|---|---|---|---|---|---|---|
| Conventional | 1 | Sorbitan (HLB 4.3) | 2.0 | Saccharose FAE (HLB 15) | 0.3 | 1.5 | 1.23 |
| | 2 | Non | 0 | Saccharose FAE (HLB 15) | 0.3 | 5.0 | 1.15 |
| Present invention | 3 | Sorbitan (HLB 4.3) | 0.05 | Saccharose FAE (HLB 15) | 0.3 | 2.8 | 0.92 |
| | 4 | Sorbitan (HLB 4.3) | 2.0 | Non | 0 | 2.7 | 0.90 |
| | 5 | Sorbitan (HLB 4.3) | 1.0 | Saccharose FAE (HLB 15) | 0.01 | 1.8 | 0.91 |
| | 6 | Glycerine (HLB 3.8) | 3.0 | Saccharose FAE (HLB 15) | 0.1 | 2.1 | 0.85 |

(Note)
Sorbitan: Sorbitan esters of fatty acids
Saccharose FAE: Sucrose esters of fatty acids
Glycerine: Mono and di glycerides

TABLE 4A

| Division | Sample No. | Emulsifying procedure | Mean particle diameter of emulsion (μm) |
|---|---|---|---|
| Conventional method | 1 | Emulsified by running the stirrer at 360 rpm for 30 minutes | 27.2 |
| | 2 | Emulsified by running the homo-mixer at 10,000 rpm for 5 minutes | Poorly emulsified (inversion) |
| Present invention | 3 | Emulsified by means of hydrophilic porous membrane (with a pore diameter of 0.5 μm) | 6.5 |
| | 4 | Emulsified by means of hydrophobic porous membrane (with a pore diameter of 3.0 μm) | 8.4 |

TABLE 4B

| Division | Sample No. | Emulsified composition (%) Fatty phase (Note 1) | Emulsified composition (%) Aqueous phase (Note 2) | Stability of spread Immediately after Production | Stability of spread −25° C.→25° C. (Note 3) | Stability of spread 5° C.→25° C. (Note 4) | Taste |
|---|---|---|---|---|---|---|---|
| Conventional method | 1 | Soybean oil 25 | Water 75 | B | D | C | b, d |
| | 2 | Soybean oil 25 | Water 75 | — | — | — | — |
| Present invention | 3 | Soybean oil 25 | Water 75 | A | B | A | a, c |
| | 4 | Soybean oil 25 | Water 75 | A | B | A | a, c |

Note 1: Contains 2.0% polyglycerin ester of condensed recinoleic acid and 0.01% β-carotene in the fatty phase.
Note 2: Contains 1.5% salt in the aqueous phase.
Note 3: Means that the sample has been stored at −25° C. overnight after the production, and has been allowed to stand at 25° C. for the subsequent seven days.
Note 4: Means that the sample has been stored at 5° C. overnight after the production, and has been allowed to stand at 25° C. for the subsequent seven days.

TABLE 5

| Sample No. | Micropore diameter of hydrophilic porous membrane (μm) | Emulsifying pressure (kg/cm²) | Emulsified composition (%) Fatty phase (Note 1) | Aqueous phase (Note 2) | Concentration of stabilizer and gelling agents in the aqueous phase (%) | Stability of spread | Taste |
|---|---|---|---|---|---|---|---|
| 1 | 0.5 | 0.005 | Soybean oil 25 Corn oil 25 | Water 50 | 0 | A | a, c |
| 2 | 0.5 | 0.005 | Soybean oil 10 Corn oil 10 | Water 80 | 0 | A | a, c |
| 3 | 0.5 | 0.005 | Soybean oil 7.5 Corn oil 7.5 | Water 85 | 0 | D | b, d |

Note 1: Contains 2.0% polyglycerin ester of condensed recinoleic acid and 0.01% β-carotene in the fatty phase.
Note 2: Contains 1.5% salt in the aqueous phase.

TABLE 6A

| Division | Sample No. | Emulsifying procedure | Mean particle diameter of emulsion (μm) |
|---|---|---|---|
| Conventional method | 1 | Emulsified by running the stirrer at 360 rpm for 30 minutes | 30.5 |
| | 2 | Emulsified by running the homo-mixer at 10,000 rpm for 5 minutes | Poorly emulsified (inversion) |
| Present invention | 3 | Emulsified by means of hydrophilic porous membrane (with a pore diameter of 3.0 μm) | 6.4 |
| | 4 | Emulsified by means of hydrophobic porous membrane (with a pore diameter of 5.0 μm) | 16.6 |

TABLE 6B

| Division | Sample No. | Emulsified composition (%) O1 phase (Note 1) | W phase (Note 2) | O2 phase (Note 1) | Surface condition | Stability of O1/W/O2 condition | Taste |
|---|---|---|---|---|---|---|---|
| Conventional method | 1 | Soybean oil 5 | Water 65 | Soybean oil 30 | B | Y | b, c, f |
| | 2 | Soybean oil 5 | Water 65 | Soybean oil 30 | — | — | — |
| Present invention | 3 | Soybean oil 5 | Water 65 | Soybean oil 30 | A | X | a, c, e |
| | 4 | Soybean oil 5 | Water 65 | Soybean oil 30 | A | X | a, c, e |

Note 1: Contains 2.0% polyglycerol ester of condensed recinoleic acid in the O1 and O2 phase.
Note 2: Contains 1.5% salt and 0.3% sucrose esters of fatty acids in the W phase.

TABLE 7

| Sample No. | Micropore diameter of hydrophilic porous membrane (μm) | Emulsifying pressure (kg/cm²) | Emulsified composition (%) O1 phase (Note 1) | W phase (Note 2) | O2 phase (Note 1) | Concentration of stabilizer and gelling agents in the Aqueous phase (%) | Stability of spread | Taste |
|---|---|---|---|---|---|---|---|---|
| 5 | 5.0 | 0.1 | Soybean oil 2.5 corn oil 2.5 | Water 50 | Soybean oil 22.5 Corn oil 22.5 | 0 | A | a, c, e |
| 6 | 5.0 | 0.1 | Soybean oil 2.5 Corn oil 2.5 | Water 75 | Soybean oil 10 Corn oil 10 | 0 | A | a, c, e |
| 7 | 5.0 | 0.1 | Soybean oil 2.5 Corn oil 2.5 | Water 80 | Soybean oil 7.5 Corn oil 7.5 | 0 | C | b, d, f |

Note 1: Contains 2.0% polyglycerol ester of condensed recinoleic acid in the O1 and O2 phase.
Note 2: Contains 1.5% salt and 0.3% sucrose esters of fatty acids in the W phase.

TABLE 8

| Sample No. | Micropore diameter of hydrophilic porous membrane (μm) | Emulsifying pressure (kg/cm²) | Emulsified composition (%) Fatty phase (Note 1) | Aqueous phase (Note 2) | Concentration of stabilizer and gelling agents in the aqueous phase (%) (Note 3) | Stability of spread | Taste |
|---|---|---|---|---|---|---|---|
| 1 | 15.0 | 30.0 | 25 | 75 | 0 | A | a, c |
| 2 | 15.0 | 30.0 | 25 | 75 | Ge 3, G1 | A | a, c |
| 3 | 15.0 | 30.0 | 25 | 75 | Ge 3, X1 | A | a, c |

TABLE 8-continued

| Sample No. | Micropore diameter of hydrophilic porous membrane (μm) | Emulsifying pressure (kg/cm²) | Emulsified composition (%) Fatty phase (Note 1) | Aqueous phase (Note 2) | Concentration of stabilizer and gelling agents in the aqueous phase (%) (Note 3) | Stability of spread | Taste |
|---|---|---|---|---|---|---|---|
| 4 | 15.0 | 30.0 | 25 | 75 | Ge 3, G1 | A | a, c |
| 5 | 15.0 | 30.0 | 25 | 75 | Ca 3, X1 | A | a, c |
| 6 | 15.0 | 30.0 | 25 | 75 | Ge 1.5, Ca 1.5 | A | a, c |
| 7 | 15.0 | 30.0 | 25 | 75 | G 0.5, X 0.5 Ca 15 | A | a, c |
| 8 | 15.0 | 30.0 | 25 | 75 | Ca 14, X 1.0 | A | a, c |
| 9 | 15.0 | 30.0 | 25 | 75 | Ca 13, X 2.0 | A | a, c |
| 10 | 15.0 | 30.0 | 25 | 75 | Ca 20.0 | A | b, d |
| 11 | 15.0 | 30.0 | 25 | 75 | Ca 18.7, X 1.3 | A | b, d |

Note 1: Contains 2.0% polyglycerin ester of condensed recinoleic acid and 0.01% β-carotene in a mixture of equal quantities of soybean oil and corn oil.
Note 2: Contains 1.5% salt in water.
Note 3: Ge means gelatine, Ca Casein, G guar gum, and X xanthan gum, respectively.

TABLE 6B

| Division | Sample No. | Emulsified composition (%) O1 phase (Note 1) | W phase (Note 2) | O2 phase (Note 1) | Surface condition | Stability of O1/W/O2 condition | Taste |
|---|---|---|---|---|---|---|---|
| Conventional method | 1 | Soybean oil 5 | Water 65 | Soybean oil 30 | B | Y | b, c, f |
| | 2 | Soybean oil 5 | Water 65 | Soybean oil 30 | — | — | — |
| Present invention | 3 | Soybean oil 5 | Water 65 | Soybean oil 30 | A | X | a, c, e |
| | 4 | Soybean oil 5 | Water 65 | Soybean oil 30 | A | X | a, c, e |

Note 1: Contains 2.0% polyglycerol ester of condensed recinoleic acid in the O1 and O2 phase.
Note 2: Contains 1.5% salt and 0.3% sucrose esters of fatty acids in the W phase.

TABLE 7

| Sample No. | Micropore diameter of hydrophilic porous membrane (μm) | Emulsifying pressure (kg/cm²) | Emulsified composition (%) O1 phase (Note 1) | W phase (Note 2) | O2 phase (Note 1) | Concentration of stabilizer and gelling agents in the Aqueous phase (%) | Stability of spread | Taste |
|---|---|---|---|---|---|---|---|---|
| 5 | 5.0 | 0.1 | Soybean oil 2.5 corn oil 2.5 | Water 50 | Soybean oil 22.5 Corn oil 22.5 | 0 | A | a, c, e |
| 6 | 5.0 | 0.1 | Soybean oil 2.5 Corn oil 2.5 | Water 75 | Soybean oil 10 Corn oil 10 | 0 | A | a, c, e |
| 7 | 5.0 | 0.1 | Soybean oil 2.5 Corn oil 2.5 | Water 80 | Soybean oil 7.5 Corn oil 7.5 | 0 | C | b, d, f |

Note 1: Contains 2.0% polyglycerol ester of condensed recinoleic acid in the O1 and O2 phase.
Note 2: Contains 1.5% salt and 0.3% sucrose esters of fatty acids in the W phase.

TABLE 8

| Sample No. | Micropore diameter of hydrophilic porous membrane (μm) | Emulsifying pressure (kg/cm²) | Emulsified composition (%) Fatty phase (Note 1) | Aqueous phase (Note 2) | Concentration of stabilizer and gelling agents in the aqueous phase (%) (Note 3) | Stability of spread | Taste |
|---|---|---|---|---|---|---|---|
| 1 | 15.0 | 30.0 | 25 | 75 | 0 | A | a, c |
| 2 | 15.0 | 30.0 | 25 | 75 | Ge 3, G1 | A | a, c |
| 3 | 15.0 | 30.0 | 25 | 75 | Ge 3, X1 | A | a, c |
| 4 | 15.0 | 30.0 | 25 | 75 | Ge 3, G1 | A | a, c |
| 5 | 15.0 | 30.0 | 25 | 75 | Ca 3, X1 | A | a, c |
| 6 | 15.0 | 30.0 | 25 | 75 | Ge 1.5, Ca 1.5 | A | a, c |
| 7 | 15.0 | 30.0 | 25 | 75 | G 0.5, X 0.5 Ca 15 | A | a, c |
| 8 | 15.0 | 30.0 | 25 | 75 | Ca 14, X 1.0 | A | a, c |
| 9 | 15.0 | 30.0 | 25 | 75 | Ca 13, X 2.0 | A | a, c |
| 10 | 15.0 | 30.0 | 25 | 75 | Ca 20.0 | A | b, d |

TABLE 8-continued

| Sample No. | Micropore diameter of hydrophilic porous membrane (μm) | Emulsifying pressure (kg/cm²) | Emulsified composition (%) | | Concentration of stabilizer and gelling agents in the aqueous phase (%) (Note 3) | Stability of spread | Taste |
|---|---|---|---|---|---|---|---|
| | | | Fatty phase (Note 1) | Aqueous phase (Note 2) | | | |
| 11 | 15.0 | 30.0 | 25 | 75 | Ca 18.7, X 1.3 | A | b, d |

Note 1: Contains 2.0% polyglycerin ester of condensed recinoleic acid and 0.01% β-carotene in a mixture of equal quantities of soybean oil and corn oil.
Note 2: Contains 1.5% salt in water.
Note 3: Ge means gelatine, Ca Casein, G guar gum, and X xanthan gum, respectively.

We claim:

1. A method for producing a water-in-oil type edible emulsion, which comprises dispersing an aqueous phase at a pressure of at least 0.01 kg/cm² into a fatty phase through a hydrophilic microporous membrane which has been rendered hydrophobic by previously immersing it in the fatty phase for a sufficient time to render it hydrophobic, whereby a water-in-oil type edible emulsion is produced.

2. A method for producing an oil-in-water-in-oil type edible emulsion, which comprises dispersing an oil-in-water type emulsion at a pressure of at least 0.01 kg/cm² into a fatty phase through a hydrophilic microporous membrane which has been rendered hydrophobic by previously immersing it in the fatty phase for a time sufficient to render it hydrophobic, whereby an oil-in-water-in-oil type edible emulsion is produced.

3. A method for producing an edible oil-in-water type emulsion, which comprises dispersing a fatty phase containing a hydrophobic emulsifying agent into an aqueous phase through a hydrophilic microporous membrane having a uniform diameter to produce an edible oil-in-water type emulsion.

4. A method according to claim 3 wherein said fatty phase contains at least 0.05% by weight of a hydrophobic emulsifying agent.

5. A method according to claim 4, wherein said fatty phase is dispersed into said aqueous phase at a pressure of at least 0.01 kg/cm².

6. A method according to claim 3, wherein said fatty phase is dispersed into said aqueous phase at a pressure of at least 0.01 kg/cm².

7. A method for producing a low-fat edible spread, which comprises dispersing an aqueous phrase which contains a stabilizer and gelling agent into a fatty phrase through a hydrophilic microporous membrane which has been rendered hydrophobic by previously immersing it in the fatty phase for a time sufficient to render it hydrophobic to produce a water-in-oil type emulsion, rapidly cooling the emulsion to plasticize it and kneading the plasticized emulsion to produce an edible low-fat spread.

8. A method according to claim 7, wherein the amount of said fatty phase is 20 to 50% by weight of the low-fat spread and the total concentration of the stabilizer and gelling agent in the aqueous phase is less than 15% by weight.

9. A method for producing an oil-in-water-in-oil type edible spread, which comprises dispersing an oil-in-water type emulsion whose aqueous phrase contains a stabilizer and gelling agent into a fatty phase through a hydrophilic microporous membrane which has been rendered hydrophobic by previously immersing it in the fatty phase for a time sufficient to render it hydrophobic to produce an oil-in-water-in-oil type emulsion, rapidly cooling the emulsion to plasticize it, and kneading the plasticized emulsion to produce an oil-in-water-in-oil type edible spread.

10. A method according to claim 9, wherein the total amount of the fatty phases in the oil-in-water-in-oil type spread is not less than 25% by weight, and the total concentration of the stabilizer and gelling agent in the aqueous phase is less than 15% by weight.

* * * * *